United States Patent
Tomiyama

(10) Patent No.: US 6,743,315 B2
(45) Date of Patent: Jun. 1, 2004

(54) BONDING APPARATUS AND BONDING METHOD OF OPTICAL DISKS

(75) Inventor: Morio Tomiyama, Ikoma (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/457,252

(22) Filed: Jun. 9, 2003

(65) Prior Publication Data

US 2003/0209304 A1 Nov. 13, 2003

Related U.S. Application Data

(62) Division of application No. 09/690,966, filed on Oct. 18, 2000, now Pat. No. 6,596,104.

(30) Foreign Application Priority Data

Oct. 19, 1999 (JP) .............................. 11-296310

(51) Int. Cl.⁷ ................................................ B32B 31/10
(52) U.S. Cl. ........................... 156/64; 156/74; 156/358; 156/360
(58) Field of Search ............................. 156/64, 74, 99, 156/100, 101, 102, 103, 104, 105, 106, 107, 356, 358, 360, 378, 582

(56) References Cited

U.S. PATENT DOCUMENTS

| 4,222,635 A | 9/1980 | Julke |
| 6,231,706 B1 * | 5/2001 | Higaki et al. ............... 156/74 |
| 6,309,485 B1 | 10/2001 | Miyamoto et al. |

FOREIGN PATENT DOCUMENTS

| JP | WO 97/40494 | 10/1997 |
| WO | WO 98/53919 | 12/1998 |

* cited by examiner

Primary Examiner—Richard Crispino
Assistant Examiner—George R. Koch, III
(74) Attorney, Agent, or Firm—RatnerPrestia

(57) ABSTRACT

An optical-disk bonding apparatus for bonding two or more disk substrates with an adhesive, has a turning table for clamping the disk substrates; a thickness gauge for measuring a thickness of bonding layers; and a rotation control unit for controlling the turning of a turning table; wherein the thickness of the bonding layers is measured with the thickness gauge on the turning table; and a rotation of the turning table or the pressure acting on the disk substrates is controlled based on the measured thickness data.

6 Claims, 5 Drawing Sheets

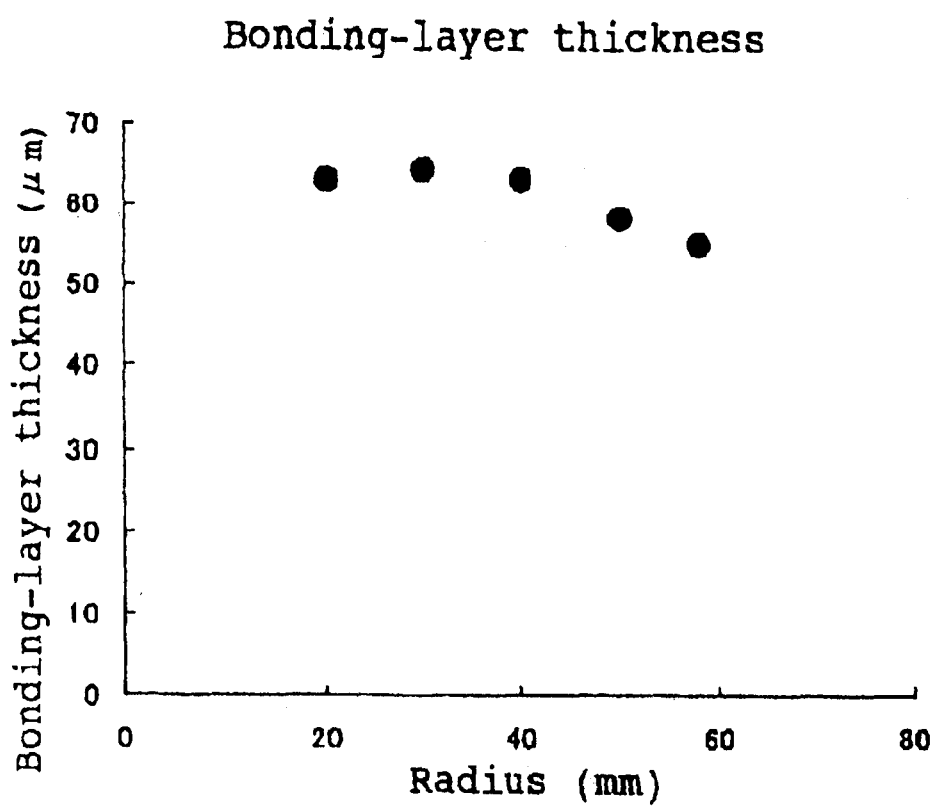

BONDING APPARATUS AND BONDING METHOD OF OPTICAL DISKS

This application is a divisional of U.S. patent application Ser. No. 09/690,966, filed Oct. 18, 2000, now U.S. Pat. No. 6,596,104 B1.

BACKGROUND OF THE INVENTION

1. Field of the Invention

The present invention relates to a manufacturing apparatus of bonded optical disks and bonding method, for producing multi-layer optical disks consisting of two or more disk substrates.

2. Related Art of the Invention

In recent years, along with increase in the amount of information required by information equipment audio-visual equipment or the like optical disks have attracted attention as a recording medium because of their excellent capabilities to provide easy data access, store large volumes of data, and reduce the size of equipment and they have been packed with information increasingly densely. For example, the packing densities of digital video disks are made higher in the following manner: two disk-shaped molded resin substrates with signals recorded on one side are bonded with ultraviolet-curing resin or the like so that both signal layers can be reproduced from one side.

However, it is difficult to play back the disks unless the thickness of the bonding layer which bonds the two signal substrates is controlled to within a designated rage. This makes it important to improve manufacturing techniques.

Now the structure of conventional optical disks will be described below. Conventional optical disks have:

(a) a first signal substrate with signal pits formed on one side by injection compression molding or the like and a translucent film layer formed on the signal side by sputtering or the like;

(b) a substrate bonding layer formed by an adhesive such as an ultraviolet-curing resin to bond the two signal substrates; and (c) a second signal substrate with signal pits formed on one side by injection compression molding or the like and a reflective film layer formed on the signal side by sputtering or the like.

To make an optical disk with such a configuration by a bonding method, the second signal substrate, for example, is clamped on the turning table with a vacuum chuck or the like, facing up the reflective film, and liquid-state, ultraviolet-curing resin is applied virtually concentrically by a dispenser revolving at a designated radius of the substrate. Alternatively, the dispenser is fixed at a designated radius of the substrate and the turning table is rotated at a low speed to apply the ultraviolet-curing resin to the substrate virtually concentrically.

The second signal substrate coated with the ultraviolet-curing resin is stacked on the first signal substrate brought by substrate transport means, on the same turning table, with the surface coated with ultraviolet-curing resin and the translucent film layer facing each other. The stacked disk on the table rotates for removal of excessive ultraviolet-curing resin, deaeration, and equalization of adhesive thickness as the turning table rotates according to a spin program which specifies the number of rotations and time of rotation.

This process is intended to reduce the variations in, and improve the reproducibility of, the thickness of the ultraviolet-curing resin layer (bonding layer) in the bonded disks.

After the adjustment of the thickness, the substrates are transferred to another table and the ultraviolet-curing resin cures under the ultraviolet light irradiated from outside the table by an ultraviolet lamp or the like. The disks are transferred to another table and the thickness of the cured ultraviolet-curing resin (bonding layer) is measured by a bonding-layer thickness gauge employing a red laser beam. The measured thickness data is used to sort the disks into good disks whose bonding-layer thickness falls under a designated range and defective disks whose bonding-layer thickness falls outside the designated range. Then the two groups of disks are separated by transport means.

However, with the prior art described above, the yield in the production process of disks is lowered by variations in the viscosity of the ultraviolet-curing resin, variations in the temperature and humidity during the application of the ultraviolet-curing resin, instability of the bonding-layer thickness caused by changes in the shape of the first and second signal substrates in the case of optical-disk bonding methods using a specific spin program, and inability to readjust the bonding-layer thickness after measurement, which is made after the ultraviolet-curing resin has cured.

SUMMARY OF THE INVENTION

The present invention, which has been made in view of the foregoing problems in the prior art, provides an optical-disk bonding apparatus and method that can control the thickness of bonding layers with a high degree of accuracy.

One aspect of the present invention is an optical-disk bonding apparatus for bonding two or more disk substrates with an adhesive, comprising:

a turning table for clamping said disk substrates; a thickness gauge for measuring a thickness of bonding layers; and a rotation control unit for controlling said turning of a turning table; wherein the thickness of the bonding layers is measured with said thickness gauge on said turning table; and a rotation of said turning table or the pressure acting on said disk substrates is controlled based on the measured thickness data.

Another aspect of the present invention is the optical-disk bonding apparatus, wherein the rotation control of said turning table consists in controlling a time of rotation or number of rotations of said turning table.

Still another aspect of the present invention is the optical-disk bonding apparatus, wherein the control of the pressure acting on said disk substrates consists in controlling an intensity of pressure or duration of pressure application.

Yet another aspect of the present invention is an optical-disk bonding apparatus for bonding two or more disk substrates with an adhesive, comprising:

a first table for clamping said disk substrates; a thickness gauge for measuring a thickness of bonding layers at least at one point on said disk substrates; a second table for holding another substrate to be bonded face to face to said disk substrates; and a pressurizing mechanism for bonding said disk substrates under pressure by moving said second table and said first table closer to each other; wherein the thickness of said bonding layers is measured with said thickness gauge; and the pressure applied by said pressurizing mechanism is controlled, based on the measured thickness data.

Still yet another aspect of the present invention is the optical-disk bonding apparatus, wherein said thickness gauge measures thicknesses at multiple points at least two radii on the disk substrates to be bonded.

A further aspect of the present invention is the optical-disk bonding apparatus, wherein said thickness gauge has at least two points of thickness measurement at the same radius on the disk substrates to be bonded.

A still further aspect of the present invention is the optical-disk bonding apparatus, wherein said thickness gauge is used as an instrument which directs a laser beam with a wavelength between 600 nm and 700 nm virtually perpendicularly onto the bonding layer of said disk substrates.

A yet further aspect of the present invention is the optical-disk bonding apparatus, wherein said turning table is made of material virtually transparent to light with wavelengths between 600 nm and 700 nm.

A still yet further aspect of the present invention is the optical-disk bonding apparatus, wherein the first table for clamping said disk substrates is a table made of material virtually transparent to light with wavelengths between 600 nm and 700 nm.

An additional aspect of the present invention is the optical-disk bonding apparatus wherein the second table for pressing another substrate to be bonded face to face to said disk substrates is a table made of material virtually transparent to light with wavelengths between 600 nm and 700 nm.

A still additional aspect of the present invention is the optical-disk bonding apparatus, wherein the first table for clamping said disk substrates comprises said pressurizing mechanism.

A yet additional aspect of the present invention is an optical-disk bonding method, wherein disk substrates are bonded while they are rotated on a turning table, a thickness of the bonding layers that bond the disk substrates is measured, and the thickness of the bonding layers is controlled to within a designated range by controlling the rotation of said turning table based on the measured thickness data.

A still yet additional aspect of the present invention is an optical-disk bonding method, wherein two disk substrates are bonded by holding them between two tables, a thickness of the bonding layer that bonds the disk substrates is measured, and the thickness of the bonding layer is controlled to within a designated range by controlling the pressing force of said tables based on the measured thickness data.

BRIEF DESCRIPTION OF THE DRAWINGS

FIG. 7 is a graph showing the results of thickness measurements taken of the bonding layer in disks bonded by the optical-disk bonding apparatus according to the second embodiment of the present invention.

DESCRIPTION OF SYMBOLS

Figure 1:
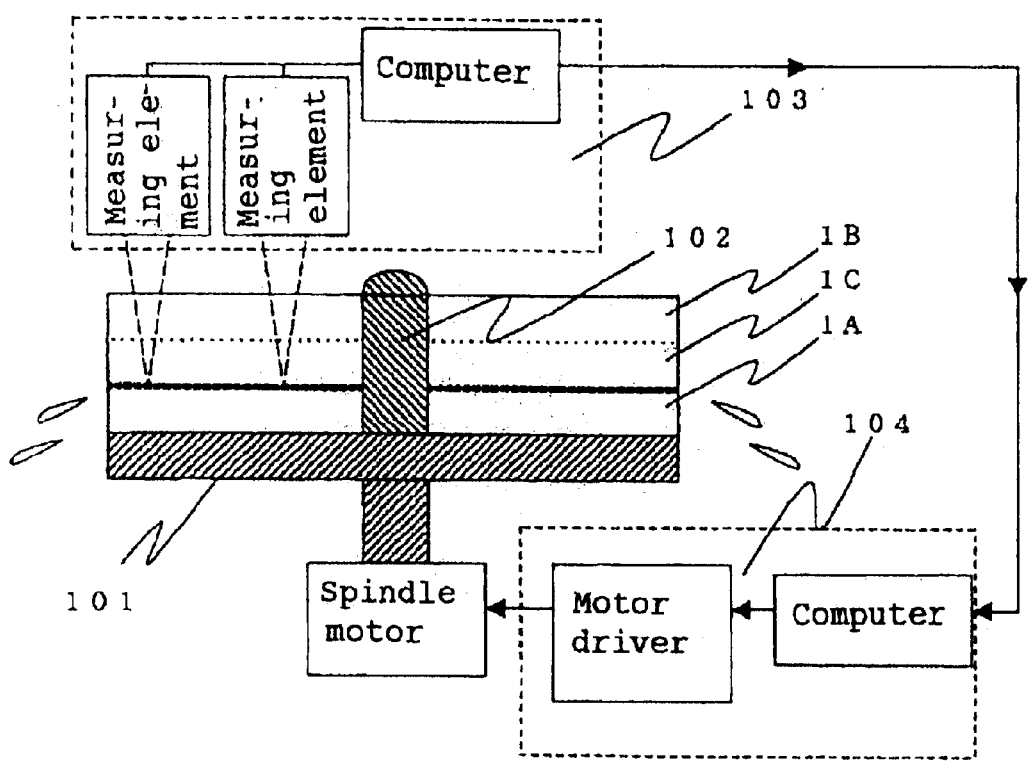
FIG. 1 is a structural drawing of the first optical-disk bonding apparatus according to the first embodiment 1 of the present invention.

101 Turning table
102 Disk centering jig
103 Bonding-layer thickness gauge
104 Rotation controller
1A Second signal substrate
1B First signal substrate
1C Bonding layer
301 First table
302 Disk centering jig
303 Second table
304 Pressurizing mechanism
305 Bonding-Layer thickness gauge
306 Pressurization controller
3A Second signal substrate
3B First signal substrate
3C Bonding layer The entire disclosure of U.S. patent application Ser. No. 09/690,966, filed Oct. 18, 2000, is expressly incorporated by reference herein.

DETAILED DESCRIPTION OF THE PREFERRED EMBODIMENTS

Preferred embodiments of the present invention will be described below with reference to drawings.

(Embodiment 1)

Embodiment 1 will be described by citing a case in which the following disk substrates are bonded: a first signal substrate made of a resin, such as polycarbonate or acrylic resin, virtually transparent (virtually permeable) to red lasers, with virtually concentric signal pits or grooves formed on one side and a translucent film of Au, Ag, or Al formed on the signal surface by sputtering, vaporization or the like; and a second signal substrate made of a resin, such as polycarbonate or acrylic resin, virtually transparent (virtually permeable) to red lasers, with virtually concentric signal pits or grooves formed on one side and a reflective film of Au, Ag, or Al formed on the signal surface by sputtering, vaporization or the like.

FIG. 1 shows the configuration of a first bonding apparatus of optical disks according to the present invention.

In FIG. 1, 101 denotes a turning table which consists of a vacuum chuck mechanism (not shown) having on its upper surface a plurality of small vacuum holes for sucking and clamping the second signal substrate 1A brought by the substrate transport means, and a disk centering jig 102 for making corrections to reduce the eccentricity between the two signal substrates to be bonded to near zero.

As the second signal substrate 1A is clamped to the turning table 101 with its reflective film surface up, an adhesive such as ultraviolet curing resin is applied by a dispenser virtually concentrically to the reflective film surface at designated radii. The translucent film surface of a first signal substrate 1B brought by the substrate transport means is stacked on the adhesive-coated surface of the second signal substrate 1A, with the disk centering jig 102 serving as an axis. The two stacked disk substrates rotate to start removal of excessive ultraviolet-curing resin, deaeration, and equalization of adhesive (bonding layer 1C) thickness when the turning table 101 starts to rotate according to a preset spin program.

103 denotes a bonding-layer thickness gauge which measures the bonding layer 1C of the disk using a red laser beam. It consists of measuring elements and a computer. It measures the thickness of the bonding layer 1C by sending a laser beam from the measuring elements virtually perpendicularly to the disk surface from the first signal substrate 1B side and receiving the light reflected from the interface (interface between materials with different refractive indices) between the layers composing the bonded disk. It can constantly measure the thickness of the disk's bonding layer 1C which changes as the turning table 101 rotates at high speed.

For example, a laser focus detector can be used as the bonding-layer thickness gauge.

104 denotes a rotation controller which can control the number of rotations or time of rotation of the turning table 101, based on the measurement results obtained by the bonding-layer thickness gauge 103. It consists of a computer which can be programmed to change the number of rotations or time of rotation of the turning table 101 as soon as the thickness data of the bonding layer 1C constantly monitored falls within a preset thickness control range, and a spindle motor driver which controls a spindle motor according to the output from the computer. The output from the spindle motor driver is transmitted to the spindle motor to drive the turning table 101.

The thickness measurement method described above and rotation control using measured thickness will be described below in a more orderly manner.

This laser focus detector consists of a thickness gauge and a computer for processing measurement data, the former comprising a laser with a wavelength which does not cure ultraviolet-curing resin, a condensing lens which condenses laser, an actuator which slides the condensing lens toward the optical axis of a laser beam, and a photodetector.

The laser beam condensed by the condensing lens enters the disk from the translucent film side virtually perpendicularly to the disk surface to be measured while the condensing lens is slid by means of the actuator. The amount of sliding of the condensing lens has been designed, taking into consideration the wavelength of the laser beam, thickness of the bonding layers, and refractive indices of the materials in the optical path of the laser beam, so that the range of sliding is large enough to measure the thickness of the bonding layers.

The focal point of the laser beam condensed by the condensing lens moves in the direction of the thickness of the disk being measured in synchronization with the sliding of the condensing lens. When the focal point is located at the interface between different materials, i.e., between the bonding layer and translucent film or between the bonding layer and reflective film, the laser beam is reflected to the condensing lens and the volume of the reflected light is detected by the photodetector after the reflected light passes through the condensing lens.

As the reflected light detected at each interface is converted into an electrical signal and sent to the computer to give the actuator position and light intensity at the time when the light was detected, the distance traveled by the actuator is calculated from the materials' refractive indices entered in advance, to determine the thickness of the bonding layer.

This gauge is installed at least at one radial position of the disk, for example, where the thickness of the bonding layer is the smallest. It starts monitoring the thickness when the laminated disk coated with ultraviolet-curing resin starts to rotate at a constant rotational speed. When the thickness of the bonding layer becomes equal to or less than a preset thickness, the computer instructs the spindle driver to stop the rotation and the spindle driver stops the spindle motor.

For example, if the gauge is installed at two radial positions where the thickness of the bonding layer is the largest and smallest, respectively, it starts monitoring the thickness when the laminated disk coated with ultraviolet-curing resin starts to rotate at a constant rotational speed. If the gauge installed at the measurement point where the thickness of the bonding layer is the smallest detects that the thickness of the bonding layer is equal to or less than a preset thickness, the computer checks the thickness data from the gauge installed at the measurement point where the thickness of the bonding layer is the largest. If the thickness is less than the preset thickness for that measurement point, the computer stops the spindle motor by instructing the spindle driver to stop the rotation. If the thickness is larger than the preset thickness, the computer decreases the number of rotations of the spindle by instructing the spindle driver to do so. In this way, the computer performs control to reduce the variation in the thickness of the bonding layer within the disk.

The bonded disk is cured by ultraviolet light in the next process.

Figure 2:
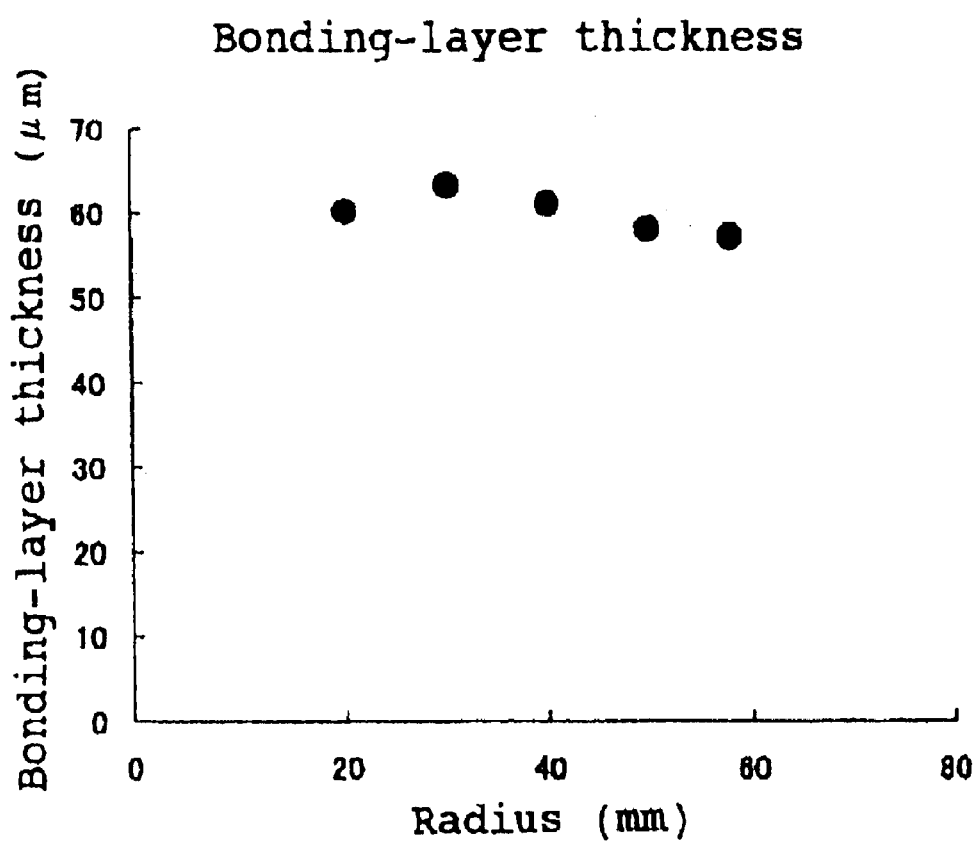
FIG. 2 is a graph showing the results of thickness measurements taken of the bonding layer in disks bonded by the optical-disk bonding apparatus according to the first embodiment 1 of the present invention with the bonding-layer thickness controlled within the range between 45 and 65 μm.

FIG. 2 shows an example of disks' bonding-layer thicknesses measured when disks were bonded by the optical-disk bonding apparatus according to the present invention under the following conditions: the viscosity of the ultraviolet-curing resin was 470 cp, the thickness measurement points for the bonding-layer thickness gauge 103 were placed at radii of 20 mm, 30 mm, 40 mm, 50 mm, and 58 mm on the disks, the higher rotational speed of the spindle was 2200 rpm, and the thickness control range of the bonding-layer was between 45 and 65 $\mu$m. The ultraviolet-curing resin was applied virtually concentrically to the translucent film side of the second signal substrate 1A at a location almost 30 mm from the center.

Figure 3:
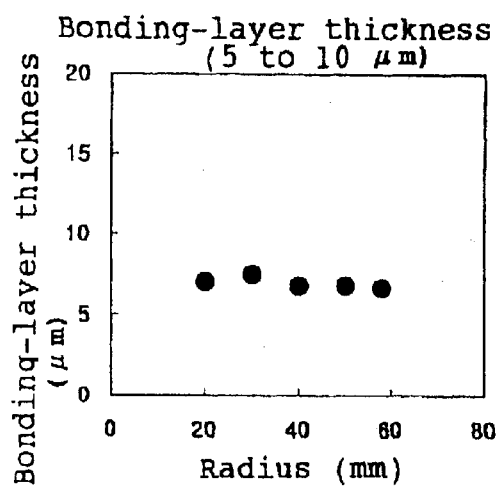
FIG. 3 is a graph showing the results of thickness measurements taken of the bonding layer in disks bonded by the optical-disk bonding apparatus according to the first embodiment 1 of the present invention with the bonding-layer thickness controlled within the range between 5 and 10 μm.
Figure 4:
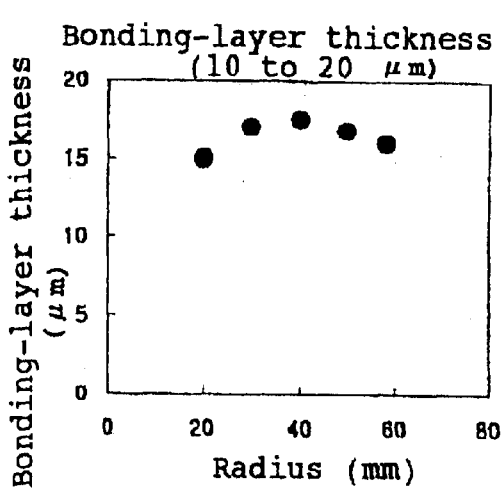
FIG. 4 is a graph showing the results of thickness measurements taken of the bonding layer in disks bonded by the optical-disk bonding apparatus according to the first embodiment 1 of the present invention with the bonding-layer thickness controlled within the range between 10 and 20 μm.
Figure 5:
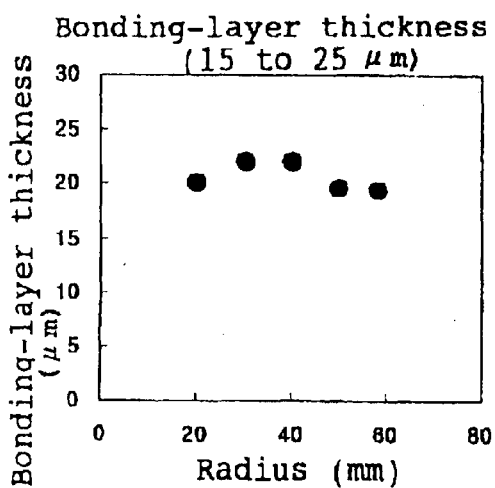
FIG. 5 is a graph showing the results of thickness measurements taken of the bonding layer in disks bonded by the optical-disk bonding apparatus according to the first embodiment 1 of the present invention with the bonding-layer thickness controlled within the range between 15 and 25 μm.

FIGS. 3, 4, and 5 show examples of disks' bonding-layer thicknesses measured when disks were bonded by the optical-disk bonding apparatus according to the present invention under the following conditions: the viscosity of the ultraviolet-curing resin was 470 cp, the thickness measurement points for the bonding-layer thickness gauge 103 were placed at radii of 20 mm, 30 mm, 40 mm, 50 mm, and 58 mm on the disks, and the thickness control range of the bonding-layer was between 5 and 10 $\mu$m, between 10 and 20 $\mu$m, or between 15 and 25 $\mu$m.

As can be seen from FIGS. 2, 3, 4, and 5, embodiment 1 of the present invention can produce a bonded disk whose bonding-layer thickness falls within specified limits.

Although the optical-disk bonding apparatus of embodiment 1 sends the measuring laser beam into the disk from the side of the first signal substrate 1B, it is also possible to measure the thickness of the bonding layer 1C by using a turning table 101 made of a material virtually transparent (permeable) to the measuring laser beam and sending the measuring laser beam from the side of the second signal substrate 1A through this turning table 101. Besides, it is possible to reduce the measuring time by providing a plurality of thickness measurement points at the same radius of the disk for the bonding-layer thickness gauge 103.

(Embodiment 2)

Embodiment 2 will be described by citing a case in which the following disk substrates are bonded, as is the case with embodiment 1: a first signal substrate made of a resin, such as polycarbonate or acrylic resin, virtually transparent (virtually permeable) to red lasers, with virtually concentric signal pits or grooves formed on one side and a translucent film of Au, Ag, or Al formed on the signal surface by sputtering, vaporization or the like; and a second signal substrate made of a resin, such as polycarbonate or acrylic resin, virtually transparent (virtually permeable) to red lasers, with virtually concentric signal pits or grooves formed on one side and a reflective film of Au, Ag, or Al formed on the signal surface by sputtering, vaporization or the like.

Figure 6:
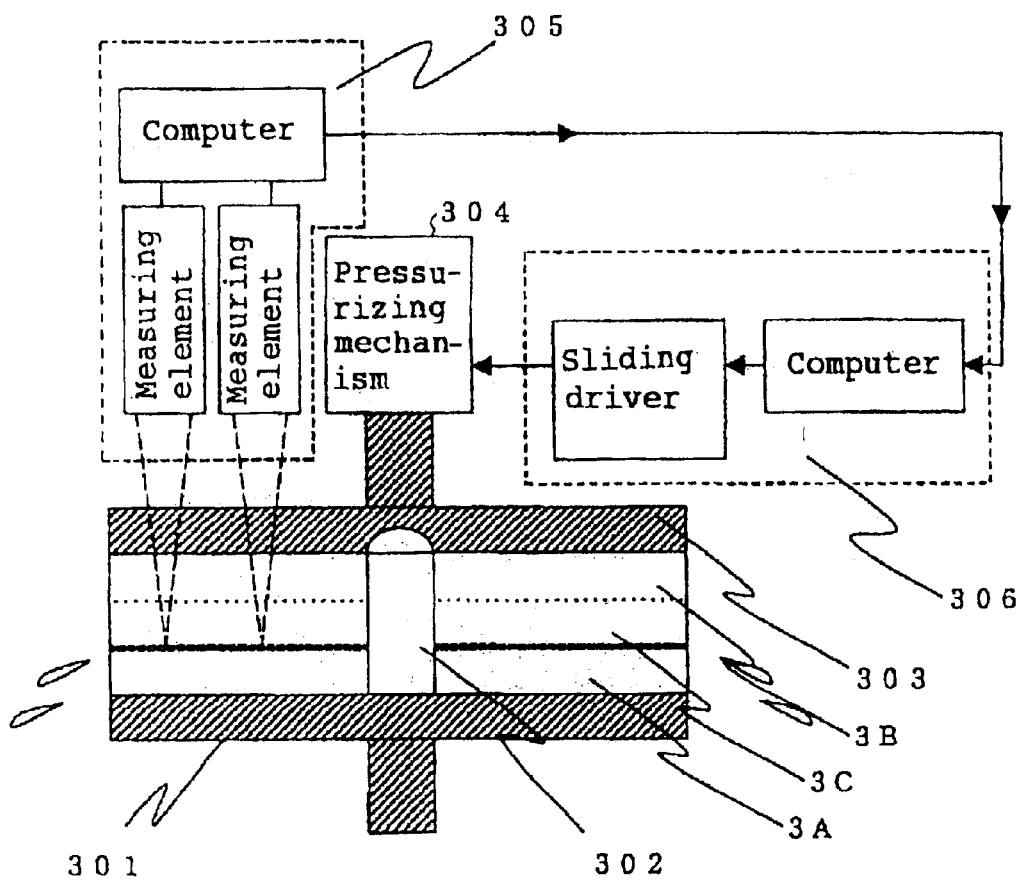
FIG. 6 is a structural drawing of the second optical-disk bonding apparatus according to the second embodiment of the present invention.

FIG. 6 shows the configuration of a second bonding apparatus of optical disks according to the present invention.

In FIG. 6, 301 denotes a first table which consists of a vacuum chuck mechanism (not shown) having on its upper surface a plurality of small vacuum holes for sucking and clamping the second signal substrate 3A brought by the substrate transport means, and a disk centering jig 302 for making corrections to reduce the eccentricity between the two signal substrates to be bonded to near zero.

As the second signal substrate 3A is clamped to the first table 301 with its reflective film surface up, an adhesive such as ultraviolet-curing resin is applied by a dispenser virtually concentrically to the reflective film surface at designated radii.

The translucent film surface of a first signal substrate 3B brought by the substrate transport means is stacked on the adhesive-coated surface of the second signal substrate 3A, with the disk centering jig 302 serving as an axis.

The second bonding apparatus further comprises a second table 303 with a surface virtually parallel to the surface of the first table 301 for holding the two stacked disk substrates between the first table 301 and itself and a pressurizing mechanism 304 for sliding the second table 303 in the direction of the disk and applying pressure to the disk surfaces.

The pressurizing mechanism 304 applies pressure to the two stacked disk substrates from the side of the first signal substrate 3B to remove excessive ultraviolet-curing resin, deaerate the disk, and equalize the adhesive thickness (bonding layer 3C).

305 denotes a bonding-layer thickness gauge which measures the bonding layer 3C of the disk using a red laser beam. It consists of measuring elements and a computer.

It measures the thickness of the bonding layer 3C by sending a laser beam from the measuring elements virtually perpendicularly to the disk surface from the first signal substrate 3B side and receiving the light reflected from the interface (interface between materials with different refractive indices) between the layers composing the bonded disk. It can constantly measure the thickness of the disk's bonding, layer 3C which changes as the second table 303 applies pressure to the disk with the help of the pressurizing mechanism 304.

For example, a laser focus detector described above can be used as the bonding-layer thickness gauge.

306 denotes a pressurization controller which can control the intensity of pressure or duration of pressure application of the second table 303, based on the measurement results obtained by the bonding-layer thickness gauge 305. It consists of a computer which can be programmed to change the intensity of pressure or duration of pressure application of the second table 303 as soon as the thickness data of the bonding layer 3C constantly monitored falls within a preset thickness control range; and a sliding driver which controls a pressurizing mechanism according to the output from the computer.

The output from the sliding driver is transmitted to the pressurizing mechanism to drive the second table 303.

Finally, the bonded disk is cured by ultraviolet light.

FIG. 7 shows an example of thicknesses of disks' bonding-layer 3C measured when disks were bonded by the optical-disk bonding apparatus according to the present invention under the following conditions: the viscosity of the ultraviolet-curing resin was 470 cp, the thickness measurement points for the bonding-layer thickness gauge 305 were placed at radii of 20 mm, 30 mm, 40 mm, 50 mm, and 58 mm on the disks, and the thickness control range of the bonding-layer was between 45 and 65 $\mu$m.

The ultraviolet-curing resin was applied virtually concentrically to the translucent film side of the second signal substrate 3A at a location almost 30 mm from the center.

As can be seen from FIG. 4, embodiment 2 of the present invention can produce a bonded disk whose bonding-layer thickness falls within specified limits.

Although the optical-disk bonding apparatus of embodiment 2 sends the measuring laser beam into the disk from the side of the first signal substrate 3B through the second table 303 made of a material virtually transparent (permeable) to the wavelength of the measuring laser beam, it is also possible to measure the thickness of the bonding layer 3C by using a first table 301 made of a material virtually transparent (permeable) to the wavelength of the measuring laser beam and sending the measuring laser beam from the side of the second signal substrate 3A through this first table 301. Besides, it is possible to improve the circumferential measurement accuracy of bonding layer thickness by providing a plurality of thickness measurement points at the same radius of the disk for the bonding-layer thickness gauge 305. Furthermore, instead of the second table 303, the first table 301 can be equipped with the pressurizing mechanism.

The present invention, which has been configured as described above, has the following effects.

Since the present invention measures the thickness of bonding layers in optical disks while they are being formed, it can control the thickness of the bonding layers within a designated range without being affected by variations in the optical disks' substrate shape, adhesive, or adhesive application step. This improves the yield in the bonding step of optical disks. Also, the present invention allows the bonding step and bonding-layer measurement step, which are conventionally carried out separately, to be performed simultaneously on a single table, resulting in reduced equipment size and process time.

Also, the accuracy of measurement can be improved by increasing the number of thickness measurement points.

Also, the use of ultraviolet-curing resin as the material for bonding layers makes it possible to measure the thickness of the bonding layers without hardening the ultraviolet-curing resin.

Also, the use of a laser beam with a wavelength between 600 nm and 700 nm makes it possible to measure the thickness of the bonding layers of optical disks through the table.

Furthermore, the placement of the pressurizing mechanism under the first table makes it possible to reduce the weight of, and secure a space in, the upper part of the apparatus.

What is claimed is:

1. An optical-disk bonding apparatus for bonding two or more disk substrates with an adhesive, comprising:

a first table for clamping said disk substrates; a thickness gauge for measuring a thickness of bonding layers at least at one point on said disk substrates; a second table for holding another substrate to be bonded face to face to said disk substrates; and a pressurizing mechanism for bonding said disk substrates under pressure by moving said second table and said first table closer to each other; wherein the thickness of said bonding layers is measured with said thickness gauge; and the pressure applied by said pressurizing mechanism is controlled, based on the measured thickness data, and said thickness gauge is an instrument which directs a laser beam with a wavelength between 600 nm and 700 nm onto the bonding layer.

2. The optical-disk bonding apparatus according to claim 1, wherein said thickness gauge measures thicknesses at multiple points at least two radii on the disk substrates to be bonded.

3. The optical-disk bonding apparatus according to claim 1, wherein said thickness gauge has at least two points of thickness measurement at the same radius on the disk substrates to be bonded.

4. The optical-disk bonding apparatus according to claim 1, wherein the first table for clamping said disk substrates comprises said pressurizing mechanism.

5. An optical-disk bonding apparatus for bonding two or more disk substrates with an adhesive, comprising:

a first table for clamping said disk substrates; a thickness gauge for measuring a thickness of bonding layers at least at one point on said disk substrates; a second table for holding another substrate to be bonded face to face to said disk substrates; and a pressurizing mechanism for bonding said disk substrates under pressure by moving said second table and said first table closer to each other; wherein the thickness of said bonding layers is measured with said thickness gauge; and the pressure applied by said pressurizing mechanism is controlled, based on the measured thickness data, and the second table for pressing another substrate to be bonded face to face to said disk substrates is a table made of material virtually transparent to light with wavelengths between 600 nm and 700 nm.

6. An optical-disk bonding method, wherein two disk substrates are bonded by holding them between two tables, a thickness of the bonding layer that bonds the disk substrates is measured by an instrument which directs a laser beam with a wavelength between 600 nm and 700 nm onto the bonding layer, and the thickness of the bonding layer is controlled to within a designated range by controlling the pressing force of said tables based on the measured thickness data.

* * * * *